Jan. 25, 1944.  A. J. DALY ET AL  2,339,840
METHOD OF MANUFACTURE OF SHEET MATERIAL AND
APPARATUS FOR THE PRODUCTION THEREOF
Filed July 17, 1940
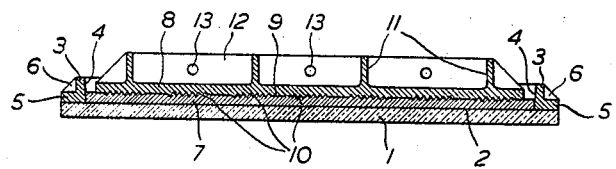
INVENTORS:
ARTHUR J. DALY
WILLIAM G. LOWE
BY
ATTORNEYS Patented Jan. 25, 1944

2,339,840

UNITED STATES PATENT OFFICE 2,339,840

METHOD OF MANUFACTURE OF SHEET MATERIAL AND APPARATUS FOR THE PRODUCTION THEREOF

Arthur John Daly and William Geoffrey Lowe, Spondon, near Derby, England, assignors to Celanese Corporation of America, a corporation of Delaware Application July 17, 1940, Serial No. 346,055
In Great Britain August 19, 1939

5 Claims. (Cl. 18—57)

This invention relates to the production of sheet material, especially relatively thick sheet material, of cellulose acetate or like thermoplastic organic film-forming material and to apparatus for the production of such material.

Sheets of such material which are sufficiently thick to be self-supporting are at present made by forming a composition containing a film-forming substance, a plasticiser and a volatile solvent into a block in a heated press, cutting sheets of the required thickness from the block, "seasoning" the sheets to remove volatile solvent and flattening the sheets to remove warping occurring during the seasoning operation and finally polishing the sheets to remove knife lines. This process involves elaborate and costly plant in the form of block presses, flattening presses and polishing presses and is somewhat slow, and lacking in flexibility. Thus, for instance, to increase the superficial dimensions of sheet materials which it is required to produce may involve laying down completely new presses. It is an object of the present invention to provide a process for the production of such sheet materials which is more rapid, less expensive and more flexible in the sense that a change in the superficial dimensions of the material produced can be made at any time at a small additional outlay.

We have found that the object referred to above can be attained by casting a solution of the film-forming substance in a volatile solvent containing an appropriate quantity of plasticiser on to the smooth flat surface of an alloy of low melting point, i. e., of melting point below about 100° C. Preferably the sheet material is stripped from the metallic surface while it still contains a substantial amount of volatile solvent and residual solvent is then removed by exposing the sheet, held under tension in a tentering device to a drying atmosphere.

Preferably the sheet is built up to the required thickness from relatively thin layers. Thus, for example, a sheet of 0.05 to 0.1", 0.2" or 0.3" or more can with advantage be built up from successive layers of thickness ranging from less than 0.005 to 0.05", for example between 0.01 and 0.025". Each layer is allowed to dry to the extent of losing the bulk of its volatile solvent before applying the next layer.

Successive layers need not be of the same thickness or composition. Thus for example pleasing effects may be produced by incorporating metallic powders or other effect materials in the dope from which the intermediate layers are formed. Some of the layers may be colourless and others contain pigments, dyes or other substances adapted to affect the quality of the light transmitted, e. g., by polarising it or excluding radiation of a particular range of wave-length, for instance radiation of high actinic value. For some purposes it is of value for one or more outer layers of the composite sheet to be more water resistant than the inner layers. This can be achieved for instance by forming the inner layers of a normal cellulose acetate having an acetyl value of say 52–54% calculated as acetic acid and forming the outer layers of a cellulose acetate of higher acetyl value. Similarly, if the outer layers are required to be less water resistant than the inner layers they may be made of a cellulose acetate of low acetyl value. The film-forming substances in successive layers may be of quite different constitution. For example the outer layers may be of cellulose acetate butyrate and the inner layers of cellulose acetate.

The casting surface, as indicated above, is formed of an alloy of low melting point. The melting point may be considerably below that of the cellulose acetate or other film-forming base from which the sheet material is to be formed. Alloys containing lead, tin, bismuth and cadmium have been found suitable.

Examples of such alloys are the following, the proportions being by weight:

| Number | Lead | Tin | Bismuth | Cadmium |
|---|---|---|---|---|
| 1 | 25 | 12.5 | 50 | 12.5 |
| 2 | 26.7 | 13.3 | 50.0 | 10.0 |
| 3 | 26.0 | 14.8 | 52.2 | 7.0 |
| 4 | 28.6 | 14.3 | 50.0 | 7.1 |
| 5 | 27.27 | 13.13 | 49.5 | 10.10 |
| 6 | 22.85 | 11.45 | 57.1 | 8.6 |
| 7 | 23.5 | 23.5 | 44.15 | 8.85 |

Such alloys have melting points between 60 and 70 or 75° C. Alloys of lower melting point in general involve the use of mercury and are preferably avoided in view of the danger of poisoning involved.

The casting surface may be formed by running the molten metal on to a flat, polished plate of glass, provided with side pieces of suitable material, so that the glass plate forms the bottom of the mould. It is of advantage to chill the surface of the alloy rapidly, and to this end the glass plate may, with advantage, be separated by a thin film of water from a metallic table. Another method of chilling the alloy rapidly is to lower into it while it is molten in the glass-bottomed mould of the kind described, a steel plate scored in such a way as to cause the alloy readily to adhere to the plate, and, after the alloy is set, to raise the steel plate and with it the solid plate of alloy to which a flat smooth surface will have been imparted by the glass. A further method is to lift a film of the molten alloy out of the body of the alloy by means of a glass slide having a smooth polished surface.

One form of apparatus for producing casting plates according to the invention is illustrated diagrammatically in sectional elevation in the accompanying drawing.

Referring to the drawing, the glass plate 1, having a flat finely polished upper surface 2, is provided with metal side-pieces 3, having sloping sides 4 to facilitate removal of the block of fusible metal, outwardly projecting flanges 5 cemented to the surface 2 of the glass plate 1 and strengthening webs 6.

The alloy is melted and poured into the mould formed by the glass plate 1 and side-pieces 3, to form a layer 7.

The iron plate 8, has its lower surface 9 scored at 10 to facilitate adhesion of the fusible alloy to the plate. The plate is reinforced with webs 11 running transversely and 12 running longitudinally. Holes 13 are provided in the webs 12 to facilitate lifting the plate out of the mould.

The plate 8 is lowered into the molten alloy 7 within the mould so as to chill the alloy rapidly and is then lifted out of the mould with the block of alloy adhering to it. The lower surface of this alloy is flat and has a high polish.

In use the assembly of plate 8 and block 7 is inverted, and sheets of the film-forming substance are cast on that surface of the block of alloy which was in contact with the glass.

By methods such as those described above, a plate of the alloy, having a flat mirror-like surface, can be formed, and this provides an excellent casting surface for the purpose of the invention. To obtain a similar surface by polishing a metallic plate is a very laborious and costly operation, which few operatives are sufficiently skilled to undertake. A glass surface of equal smoothness can readily be obtained, but the use of glass has certain disadvantages compared with that of the low melting alloy. Thus, heat transmission through the glass is much slower. There is always the danger of breakage of the glass, and unless the solvent content of the sheet material remain sufficiently high, stripping may result in damage to the glass. The casting plates of the present invention can be used many times before showing signs of wear or damage, and can then be re-melted and re-cast. Moreover, if desired, the sheet of cellulose acetate or the like can be cast on to the surface of the molten alloy. This ensures a perfectly flat smooth surface. The invention includes the production of the casting surface of low melting alloy as well as the use of such a surface in the production of sheet materials of the kind referred to.

The proportion of plasticiser in the sheet material may with advantage be between 30 and 40 to 50% based on the weight of the cellulose acetate. This proportion of plasticiser facilitates drying of the sheet material in the initial stages, possibly by reducing the tendency to the formation of a skin on the surface which hampers evaporation. Any suitable plasticiser for the film-forming material can be employed, for example in the case of cellulose acetate we may employ dimethyl phthalate, diethyl phthalate, dimethoxy ethyl phthalate, diethoxy ethyl phthalate, methyl phthalyl glycollate, methyl phthalyl methyl glycollate, triacetin, diethyl tartrate, or dibutyl tartrate. Plasticisers which are adapted to increase the fire resistance of the material, for example tricresyl phosphate, triphenyl phosphate, tributyl phosphate, trichloroethyl phosphate and trichlorobutyl phosphate, may also be present, preferably, however, in admixture with plasticisers of greater affinity for cellulose acetate.

When cellulose acetate is employed as the film-forming substance, acetone may with advantage be used as the volatile solvent. Other suitable volatile solvents are dioxane and methylene ethylene ether. Solvent mixtures may also be employed, for example mixtures of a latent solvent such as ethylene dichloride or methylene dichloride in ethyl or methyl alcohol or mixtures containing a true solvent such as acetone or dioxane in admixture with a volatile diluent such as benzene or xylene and a low or medium boiling liquid of lower solvent power than the acetone or dioxane, for example ethyl acetate or methyl or ethyl alcohol. High boiling solvents such as ethyl lactate or diacetone alcohol may also be present. It is preferable, however, to employ a simple volatile solvent and it is one of the advantages of the process of the invention that sheets of excellent clarity can be obtained using a simple solvent such as acetone. This facilitates solvent recovery, which is also facilitated by the simplicity of the process and apparatus. The removal of the bulk of the volatile solvent can be effected at ordinary temperatures or at elevated temperatures, for example 30–40° C. or even higher. When working at relatively high temperatures especial care must be taken to ensure freedom of the air and of the casting surface from dust, with a view to avoiding bubble formation.

It is of advantage to strip the sheet material from the casting surface before completely removing the volatile solvent, e. g. while the material still contains some 10 or 12–15% of its weight of solvent. Substantial removal of the remainder of the volatile solvent can then be effected while the sheet material is stretched on a tentering device in a warm atmosphere.

The solution employed may contain between 10 and 40% by weight of the cellulose acetate or other film-forming substance. The concentration may for example, lie between 15 and 25%, or between 25 and 35%.

The invention has been described with particular reference to the use of cellulose acetate as the film-forming substance. Other thermoplastic organic film-forming substances, may, however, be used in the process of the invention, for example other derivatives of cellulose such as cellulose propionate, cellulose butyrate, cellulose acetate-butyrate, cellulose acetate-propionate, cellulose acetate-stearate, cellulose nitrate, cellulose nitrate-acetate, cellulose nitrate-propionate and cellulose ethers such as ethyl, propyl and benzyl cellulose. Other thermoplastic organic film-forming substances that can be employed include polyvinyl esters, for example polyvinyl acetate, polyvinyl chloride and co-polymers of vinyl acetate and vinyl chloride, polyvinyl ethers, polyvinyl ketones, polymerised esters of the acrylic acid series, for instance polymethyl methacrylate, and other film-forming polymerised unsaturated compounds, for example synthetic resins of the polystyrene class.

Some of the advantages of the present invention have already been mentioned. Thus, the process of the invention is simple and inexpensive both in capital outlay and in operation. Process and apparatus can rapidly and inexpensively be turned from the production of sheets of one size to sheets of another size. The casting surface is less easily damaged than a glass surface and can be quickly and cheaply reformed when desired. The alloy is a good heat conductor compared with glass. Production of the solution from which the sheet materials are cast is also simple and does not involve the use of complex solvent mixtures or of laborious milling operations. Solvent recovery is simple. In addition, the products of the invention have certain advantages over products made by the known method referred to above. Thus, they have greater flexibility and clarity. They can be subjected to processes such as saponification which modify the surface without a subsequent polishing operation being necessary to remove knife lines.

Instead of stripping the sheet from the plate after removing the bulk of the volatile solvent, the plate may be removed from the sheet by heating the assembly to a temperature sufficient to melt the alloy without damaging the sheet.

Having described our invention, what we desire to secure by Letters Patent is:

1. Process for the production of a film-casting support, which comprises forming a block of an alloy melting below about 100° C., by pouring said alloy in molten form on to a flat polished surface of a glass plate, rapidly chilling the alloy by immersing therein a base-plate of a high melting metal adapted to adhere to, but not to alloy with, the low melting alloy, allowing the alloy to set with the base-plate in position and removing the block of alloy having said base-plate embedded therein without damaging that surface of said block which was in contact with said glass plate.

2. Process for the production of sheet material, which comprises forming a film-casting support by the process claimed in claim 1, and casting on to that surface of the alloy which was in contact with the flat polished surface of the glass, a solution of a thermoplastic organic film-forming substance, selected from the group consisting of cellulose esters and synthetic resins, in a volatile solvent, said film-forming substance having a melting point higher than that of said alloy removing the bulk of said solvent and separating the sheet so formed from said surface by heating to a temperature sufficient to melt the alloy without damaging the sheet material.

3. Process for the production of sheet material, which comprises forming a film-casting support by the process claimed in claim 1, and casting on to that surface of the alloy which was in contact with the flat polished surface of the glass, a solution of a thermoplastic organic film-forming substance, selected from the group consisting of cellulose esters and synthetic resins, in a volatile solvent, said film-forming substance having a melting point higher than that of said alloy removing the bulk of said solvent and separating the sheet so formed from said surface by heating to a temperature sufficient to melt the alloy without damaging the sheet material and recasting the alloy to form the support for a fresh film-casting operation.

4. Process for the production of sheet material, which comprises forming a film-casting support by the process claimed in claim 1, and casting on to that surface of the alloy which was in contact with the flat polished surface of the glass, a solution of cellulose acetate in a volatile solvent comprising acetone, said cellulose acetate having a melting point higher than that of said alloy, removing the bulk of said solvent and separating the sheet so formed from said surface by heating to a temperature sufficient to melt the alloy without damaging the sheet material.

5. Process for the production of sheet material, which comprises forming a film-casting support by the process claimed in claim 1, and casting on to that surface of the alloy which was in contact with the flat polished surface of the glass, a solution of cellulose acetate in a volatile solvent comprising acetone, said cellulose acetate having a melting point higher than that of said alloy, removing the bulk of said solvent and separating the sheet so formed from said surface by heating to a temperature sufficient to melt the alloy without damaging the sheet material and recasting the alloy to form the support for a fresh film-casting operation.

ARTHUR JOHN DALY.
WILLIAM GEOFFREY LOWE.